(12) United States Patent
Na

(10) Patent No.: US 9,007,789 B2
(45) Date of Patent: Apr. 14, 2015

(54) ELECTRIC CIRCUIT FOR HIGH VOLTAGE POWER CONVERSION

(76) Inventor: Chen Na, Cerritos, CA (US)

( * ) Notice: Subject to any disclaimer, the term of this patent is extended or adjusted under 35 U.S.C. 154(b) by 551 days.

(21) Appl. No.: 13/323,803

(22) Filed: Dec. 12, 2011

(65) Prior Publication Data
US 2013/0148390 A1 Jun. 13, 2013

(51) Int. Cl.
*H02M 7/487* (2007.01)
*H02M 7/49* (2007.01)

(52) U.S. Cl.
CPC .............. *H02M 7/487* (2013.01); *H02M 7/49* (2013.01)

(58) Field of Classification Search
USPC ........ 363/40, 41, 43, 71, 95, 97, 98, 131, 132
See application file for complete search history.

(56) References Cited

U.S. PATENT DOCUMENTS

| | | | | |
|---|---|---|---|---|
| 6,101,109 A * | 8/2000 | Duba et al. | | 363/71 |
| 6,320,767 B1 * | 11/2001 | Shimoura et al. | | 363/37 |
| 6,377,478 B1 * | 4/2002 | Morishita | | 363/34 |
| 7,430,132 B2 * | 9/2008 | Morishita | | 363/55 |
| 7,679,941 B2 * | 3/2010 | Raju et al. | | 363/37 |
| 8,248,828 B2 * | 8/2012 | Morishita et al. | | 363/71 |
| 2007/0147098 A1 * | 6/2007 | Mori et al. | | 363/71 |
| 2007/0279957 A1 * | 12/2007 | Oohashi et al. | | 363/132 |
| 2011/0103116 A1 * | 5/2011 | Asplund | | 363/131 |
| 2011/0128763 A1 * | 6/2011 | Iwata et al. | | 363/98 |
| 2011/0211381 A1 * | 9/2011 | Iwata et al. | | 363/132 |
| 2011/0273916 A1 * | 11/2011 | Fujiwara et al. | | 363/71 |
| 2012/0099353 A1 * | 4/2012 | Azuma et al. | | 363/71 |
| 2012/0113695 A1 * | 5/2012 | Chivite Zabalza et al. | | 363/71 |

FOREIGN PATENT DOCUMENTS

WO WO 2010086929 A1 * 8/2010

* cited by examiner

*Primary Examiner* — Fred E Finch, III
(74) *Attorney, Agent, or Firm* — Xianghui Huang

(57) ABSTRACT

The present invention provides an electric circuit wherein a multi-phase bridge is connected in series with a plurality of single-phase bridges. The multi-phase bridge is composed of a plurality of 3-level diode clamped legs, while the single-phase bridges each is composed of two 3-level diode clamped legs. The present invention also provides control strategy for synthesizing multi-level voltage waveforms from output voltages of the multi-phase bridge and the plurality of single-phase bridges.

11 Claims, 10 Drawing Sheets

ELECTRIC CIRCUIT FOR HIGH VOLTAGE POWER CONVERSION

FIELD

The present invention relates to an electric circuit and control strategy for operating the electric circuit. Specifically, the present invention relates to an electric circuit and control strategy employed in high voltage power conversion.

BACKGROUND OF THE INVENTION

There is a growing demand for high voltage power conversion for a variety of industrial applications. For example, converters with an output voltage of 3.3-13.8 kV and an output power of 1-100 MW may be used in process control in the mining and mineral, power, water, and metals industries.

Challenges to implement high voltage power conversion come from the operating limits of commercially available semiconductor devices. First, commercially available semiconductor devices may have only limited voltage blocking capability such as up to 6.5 kV and a few thousand amperes. Therefore, a high voltage power converter may combine multiple semiconductor devices in series and/or parallel to reach a high voltage AC output. Second, industrial applications employing power converters typically require the AC outputs of power converters to have low harmonic distortion. AC outputs of power converters are typically pulsed multi-level waveforms. In order to reduce the harmonic distortion, it is desired to increase the frequency of the pulses by increasing the switching frequency of the semiconductor devices. However, semiconductor devices may work up to limited switching frequency. For example, low-voltage devices with blocking voltage of 0.6-1.7 kV may operate up to 20 kHz. However, high-voltage devices with blocking voltage of 3.3-6.5 kV may be switched only at a few hundred to 1000 Hz, which is not much higher than the fundamental frequency of the output voltage and therefore produces poor harmonic distortion.

U.S. Pat. No. 5,625,545 to Hammond discloses a power converter that employs a cascaded H-bridge circuit. An exemplary 3-phase cascaded H-bridge circuit 100 is illustrated in FIG. 1. With reference to FIG. 1, the 3-phase cascaded H-bridge circuit 100 consists of 3n H-bridge power cells 102(1-n), 104(1-n), and 106(1-n). The H-bridge power cells 102(1-n), 104(1-n), and 106(1-n) are identical. Each H-bridge power cell 102(1-n), 104(1-n), and 106(1-n) includes a DC bus capacitor 130 and an H-bridge inverter composed of Insulated Gate Bipolar Transistors (IGBTs) 122 and diodes 124. The H-bridge power cells 102(1-n), 104(1-n), and 106(1-n) are cascaded in series to form 3-phase AC outputs A, B, and C. The DC bus capacitors 130 of the H-bridge power cells 102(1-n), 104(1-n), and 106(1-n) must be isolated from each other and may be supplied from secondary windings of an input multi-winding transformer in order to provide the necessary electrical isolation. In practice, a cascaded H-bridge circuit typically employs low-voltage semiconductor devices that may be switched at a high frequency to reduce harmonic distortion, and uses a great number of H-bridge power cells to output high AC voltages. For example, a commercial 10 kV 3-phase cascaded H-bridge inverter may consist of 27 H-bridge power cells using 1.7 kV IGBTs. It may require an input multi-winding transformer having at least 27 secondary windings, each of which supplies the DC bus of one H-bridge power cell. The size and weight of the input multi-winding transformer may become significant and add complexity and cost to the power converter.

U.S. Pat. No. 5,459,655 to Mori et al. discloses a power converter that employs a multi-level diode clamped circuit. An exemplary single-phase multi-level diode clamped circuit 200 is illustrated in FIG. 2. With reference to FIG. 2, the multi-level diode clamped circuit 200 may include multiple DC capacitors 231, 232, 233, 234, 235, and 236 that are connected in series to form a DC bus. The DC capacitors 231-236 may be identical and therefore divide the DC bus voltage into equal levels, for example, seven levels along the DC bus of the exemplary multi-level diode clamped circuit 200 in FIG. 2. The multi-level diode clamped 200 may include cascaded IGBTs 222 each in parallel with a freewheeling diode 224, along with cascaded clamped diodes 226. By controlling the IGBTs 222 with appropriate switching signals, the AC output terminal A may be electrically connected to each of the seven discrete voltage levels along the DC bus, and thus generates a 7-level voltage waveform.

A 3-level diode clamped circuit, as shown in FIG. 3, is most practically used, because of the well-known challenge to operate a diode clamped multi-level circuit beyond three levels while still balancing the DC voltages across the DC capacitors. However, a 3-level diode clamped circuit poses other challenges in use. Because its output voltages have only three levels, a 3-level diode clamped circuit provides poor harmonic distortion and needs an immense amount of filters to smooth out output harmonics. Furthermore, a 3-level diode clamped circuit may not be able to generate AC outputs of required amplitudes. For example, using 6.5 kV semiconductor devices, the output of a 3-phase 3-level diode clamped circuit may only reach 4.16 kV. To output higher AC voltages such as 6.6 kV or larger, multiple semiconductor devices may have to be combined in series and switched together as a single device. Semiconductor devices may have non-uniform switching and conduction characteristics because of manufacturing variations. Synchronization of multiple semiconductor devices may have to require special hardware and software designs that add complexity and weakness prone to instability and fault.

SUMMARY OF THE INVENTION

The present invention provides an electric circuit that may include a multi-phase bridge connected in series with a plurality of single-phase bridges. The multi-phase bridge and the single-phase bridges are all composed of 3-level diode clamped legs. The multi-phase bridge and single-phase bridges may further use identical 3-level diode clamped legs, which include the same number of switching elements of the same type and ratings and are configured in the same means, to provide a modular and cost effective way for a power converter design. This circuit provides features that attempt to solve one or more of the limitations of traditional circuits described above. First, compared to a conventional multi-level diode clamped circuit, in the present invention, the AC output voltages can reach seven, eleven or even higher levels, but without the concern of DC capacitor voltage balancing that is faced by a conventional multi-level diode clamped circuit beyond three levels. Increasing levels also lowers harmonic distortions of the AC output waveforms and reduces the need for filtering. Second, compared to a conventional 3-level diode clamped circuit, the present circuit can generate AC outputs with larger amplitudes. Finally, compared to a conventional cascaded H-bridge circuit, the present invention needs less number of isolated DC buses. It therefore reduces the required number of secondary windings of the input transformer and lowers its size, weight, and cost.

Exemplary embodiments of the present invention will be described in accordance with drawings to assist in providing a better understanding of the disclosure.

DETAILED DESCRIPTION OF THE INVENTION

Figure 1:
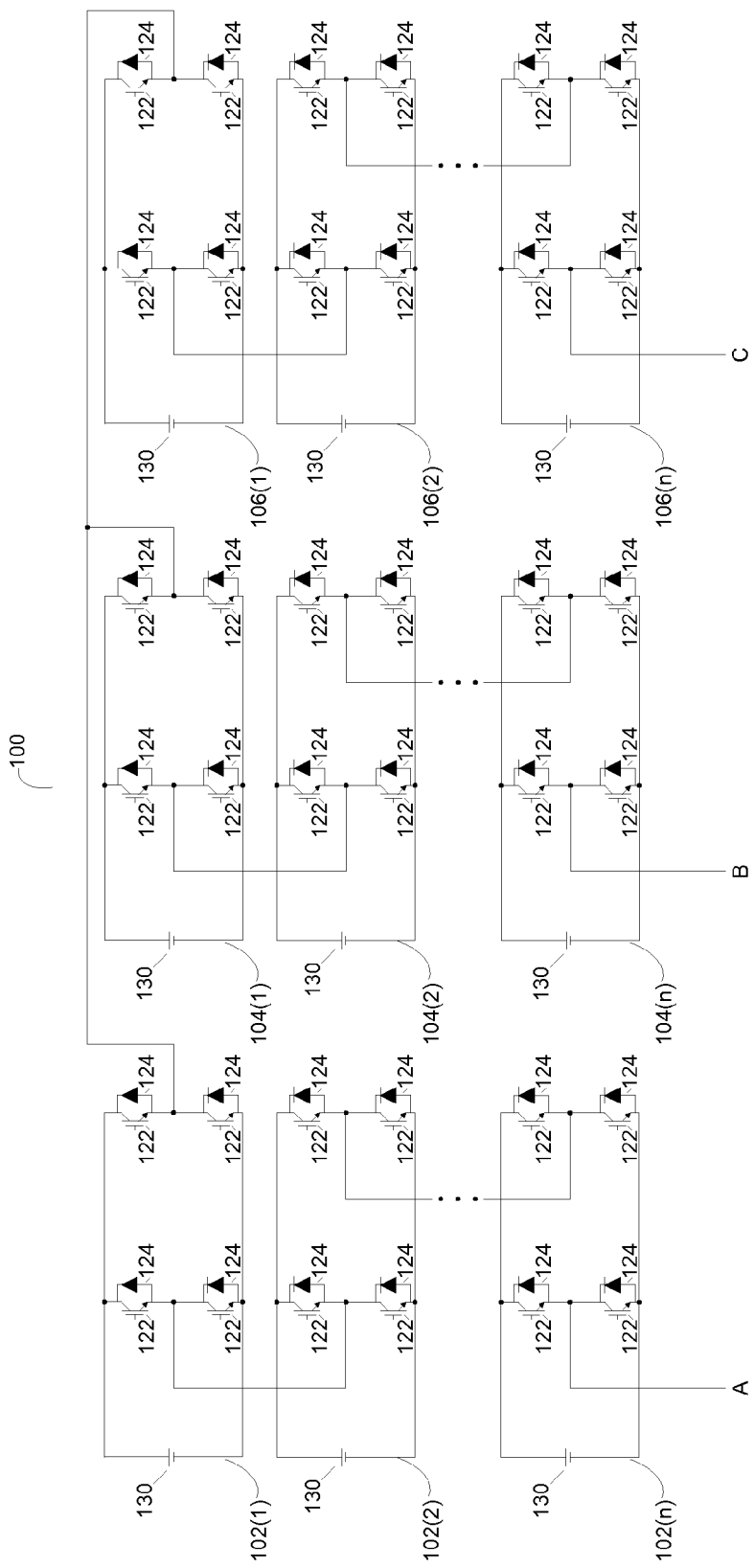
FIG. 1 is a simplified schematic diagram of a cascaded H-bridge circuit.
Figure 2:
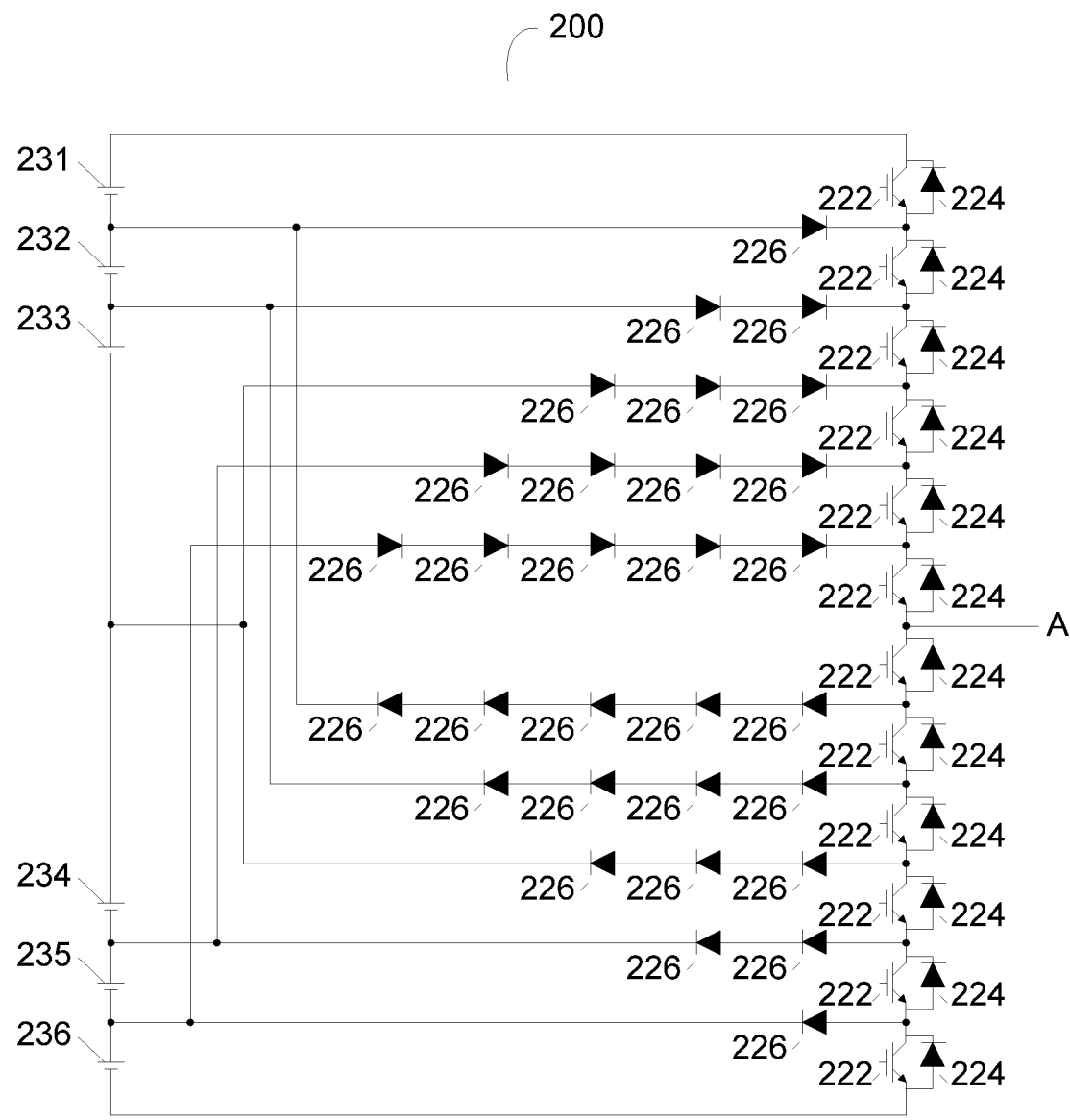
FIG. 2 is a simplified schematic diagram of a multi-level diode clamped circuit.
Figure 3:
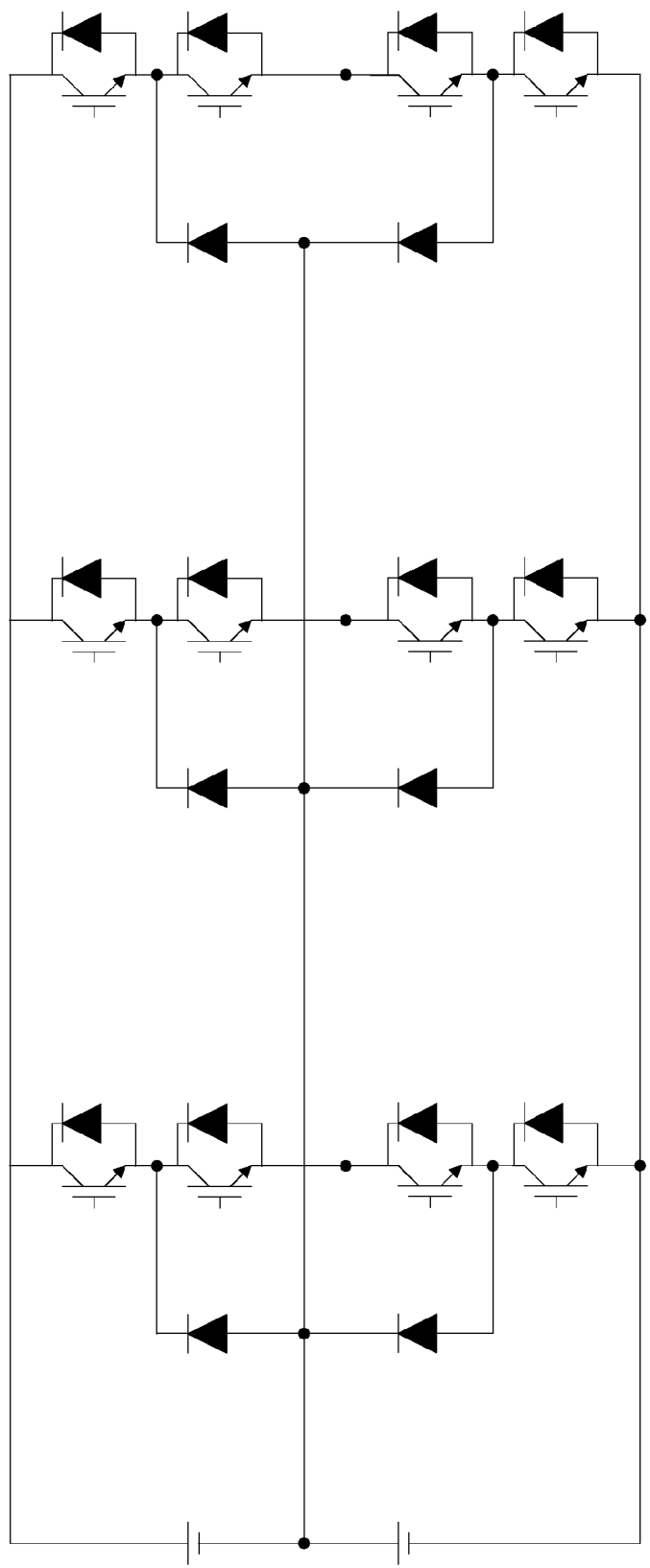
FIG. 3 is a simplified schematic diagram of a 3-level diode clamped circuit.

In the following detailed description, specific embodiments of the present invention are described. However, to the extent that the following description is specific to a particular embodiment or a particular use of the present invention, this is intended to be for exemplary purposes only and simply provides a description of the exemplary embodiments. Accordingly, the invention is not limited to the specific embodiments described below, but rather, includes all alternatives, modifications, and equivalents falling within the true spirit and scope of the appended claims. The figures and description of the specific embodiments have been simplified to illustrate elements that are relevant for a clear understanding of the present invention, while eliminating, for purpose of clarity, other elements that may be well-known in the art. Those of ordinary skills in the art will recognize that other elements are desirable and/or required in order to implement the present invention.

A simplified schematic diagram of an exemplary 3-phase electric circuit 300 in accordance with the present invention is illustrated in, and will be described with reference to, FIG. 4. The 3-phase electric circuit 300 may include a 3-phase bridge 302 connected in series with three single-phase bridges 304, 306, and 308 respectively for each phase to provide 3-phase AC output voltages A, B, and C. The 3-phase bridge 302 may have a DC bus composed of two DC capacitors 332 and 334 connected in series. The DC capacitors 332 and 334 may be identical and thus create three DC voltage potentials along the DC bus, for example, a positive DC bus 342, a neutral point 344, and a negative DC bus 346. The 3-phase bridge 302 includes three 3-level diode clamped legs 312, 314, and 316. The 3-level diode clamped legs 312, 314, and 316 may be identical. The 3-level diode clamped legs 312, 314, and 316 are connected in parallel across the positive DC bus 342 and negative DC bus 346 of the 3-phase bridge 302. The 3-level diode clamped legs 312, 314, and 316 each may consist of four cascaded IGBTs 322, each of which is in parallel with a free-wheeling diode 324. Two clamped diodes 326 are connected in series between the middle point of top two pairs of IGBTs 322 and free-wheeling diodes 324 and the middle point of bottom two pairs of IGBTs 322 and free-wheeling diodes 324. The middle point of the two cascaded clamped diodes 326 is further connected to the neutral point 344. By controlling the IGBTs 322 by appropriate switching signals, each of the output terminals 372, 374, and 376 may be electrically connected to the positive bus 342, the neutral point 344, and the negative DC bus 346, thus providing a 3-level voltage waveform with respect to the neutral point 344.

The single-phase bridges 304, 306, and 308 are identical, and therefore only the single-phase bridge 304 is described herein. The single-phase bridge 304 may have a DC bus composed of two DC capacitors 352 and 354 connected in series. The DC capacitors 352 and 354 may be identical and thus create three DC voltage potentials along the DC bus, for example, a positive DC bus 362, a neutral point 364, and a negative DC bus 366. The single-phase bridge 304 includes two 3-level diode clamped legs 392 and 394. The 3-level diode clamped legs 392 and 394 may be identical. The 3-level diode clamped legs 392 and 394 are connected in parallel across the positive DC bus 362 and negative DC bus 366 of the single-phase bridge 304. The 3-level diode clamped legs 392 and 394 each may consist of four cascaded IGBTs 332 each in parallel with a free-wheeling diode 334. Two clamped diodes 336 are connected in series between the middle point of top two pairs of IGBTs 332 and free-wheeling diodes 334 and the middle point of bottom two pairs of IGBTs 332 and free-wheeling diodes 334. The middle point of the two cascaded clamped diodes 336 is further connected to the neutral point 364. By controlling the IGBTs 332 by appropriate switching signals, each of the output terminals 372 and 82 may be electrically connected to the positive bus 362, the neutral point 364, and the negative DC bus 366, thus providing a 3-level voltage waveform with respect to the neutral point 364.

It should be understood that other types of switching components can be used in place of IGBTs, such as Gate Commutated Thyristors (GCTs), Field Effect Transistors (FETs), and the like. It will be also appreciated that multiple switching components may be combined in series and/or parallel and operated synchronously in place of a single IGBT.

The 3-phase AC output voltages A, B, and C of the 3-phase electric circuit 300 are synthesized by combining the output voltages of the 3-phase bridge 302 and the output voltages of the three single-phase bridges 304, 306, and 308, respectively. The voltage synthesization is illustrated by a simplified vector diagram of FIG. 5 for the exemplary 3-phase electric circuit 300. For example, the AC output voltage of phase A equals to $V_A = V_{(382, 364)} - V_{(372, 364)} + V_{(372, 344)}$, where $V_{(382, 364)}$, $V_{(372, 364)}$, and $V_{(372, 344)}$ are the output voltage at the terminal 382 of the single-phase bridge 304, the output voltage at the terminal 372 of the single-phase bridge 304, and the output voltage at the terminal 372 of the 3-phase bridge 302, respectively. It is observed that the output voltages $V_{(382, 364)}$, $V_{(372, 364)}$, and $V_{(372, 344)}$ may each possess a 3-level voltage waveform. Therefore, one can achieve a 7-level voltage waveform for $V_A$ when adding these three voltages together. Same implementation applies to the AC output voltages of phases B and C.

It should be understood that the DC buses of the 3-phase bridge 302 and the single-phase bridges 304, 306, and 308 are isolated from each other. Furthermore, the DC bus voltage of the 3-phase bridge 302 may be equal to the DC bus voltages of the single-phase bridges 304, 306, and 308, and the 3-phase bridge 302 may use identical 3-level diode clamped bridges as the single-phase bridges 304, 306, and 308. This allows a modular and cost effective means for a power converter design. Essentially, one needs to design only one type of 3-level diode clamped leg, assembles three of such legs in parallel with one DC bus to form a 3-phase bridge, assembles other two of such legs in parallel with another DC bus to form a single-phase bridge, repeat above step to form two more single-phase bridges, and connects the 3-phase bridge in series with the three single-phase bridges for each phase to form a 3-phase electric circuit of FIG. 4 as presented in this invention.

Figure 4:
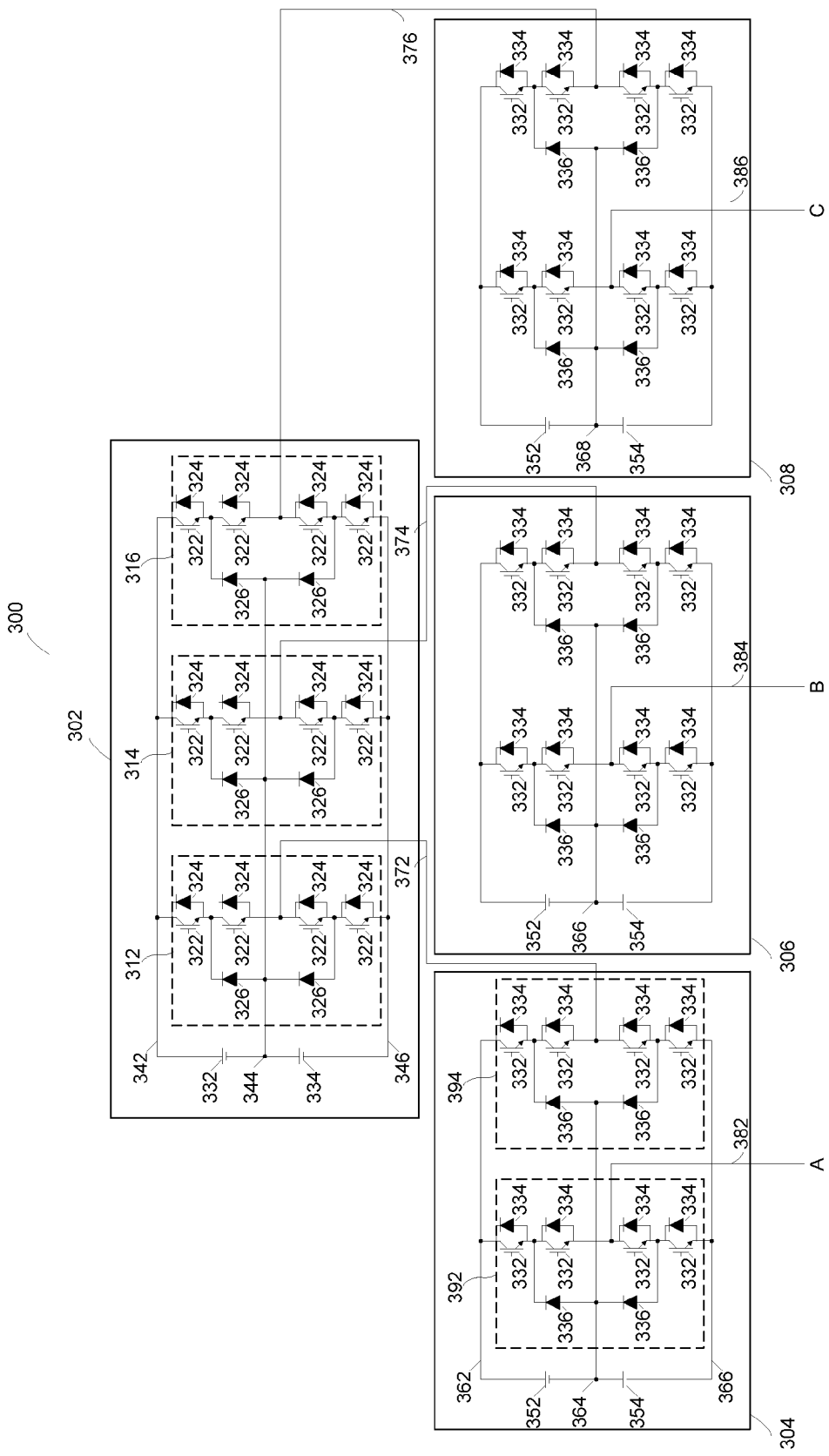
FIG. 4 is a simplified schematic diagram of an exemplary 3-phase electric circuit for high voltage power conversion in accordance with the present invention.
Figure 6:
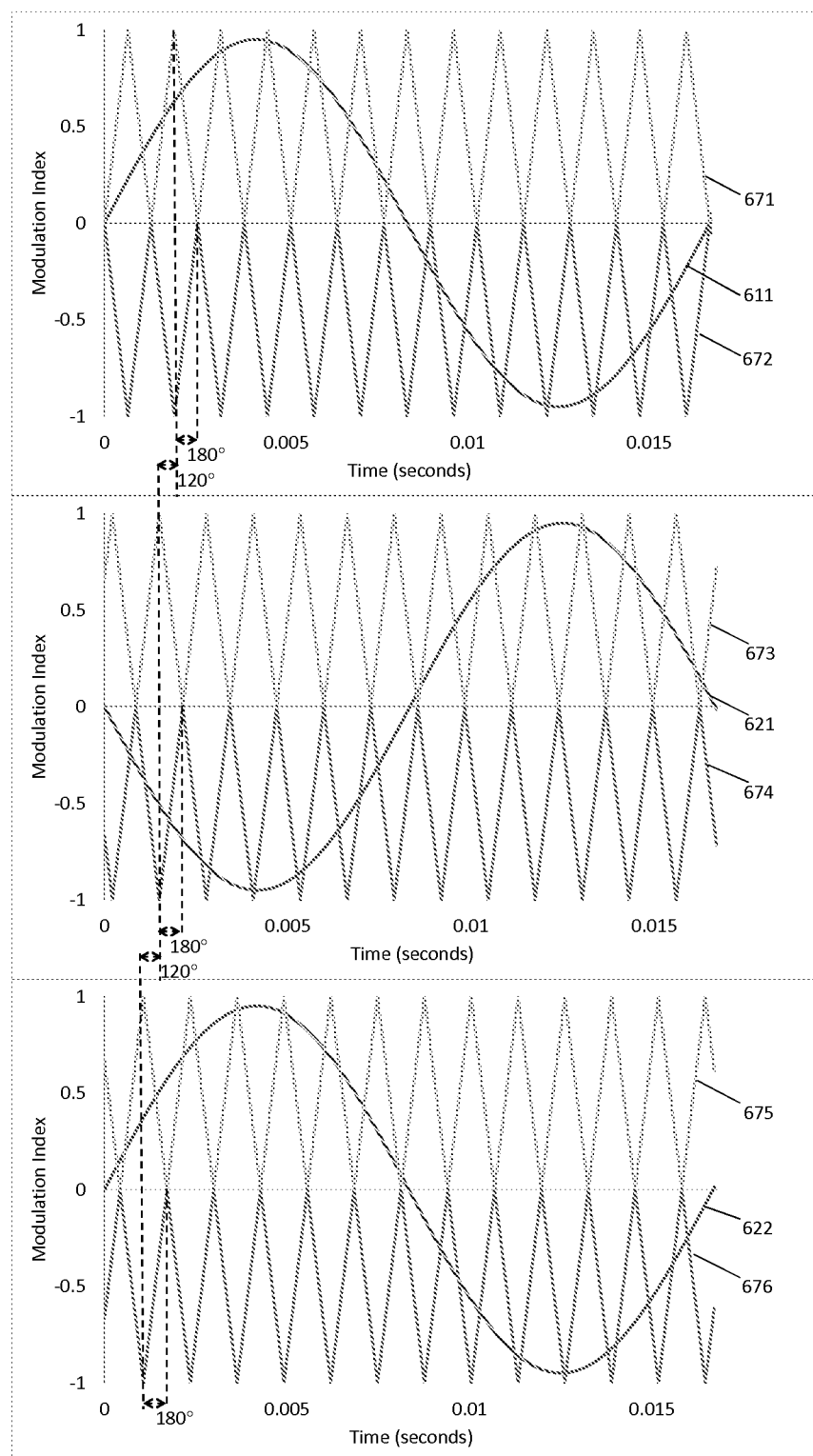
FIG. 6 is a waveform diagram illustrating exemplary sets of reference and carrier signals that may be used to generate gating signals for controlling the exemplary 3-phase electric circuit of FIG. 4.

An exemplary control strategy is illustrated in FIG. 6 that may be used for controlling the exemplary 3-phase electric circuit 300 in FIG. 4. Because the three phases A, B, and C are controlled symmetrically, control strategy for only phase A is described herein. The 3-level diode clamped legs 312, 392, and 394 may be controlled by pulse-width-modulation (PWM) signals generated by comparing reference signals with carrier signals. As illustrated in FIG. 6, the reference signal 611 is compared with a pair of carrier signals 671 and 672 to generate PWM signals for the 3-level diode clamped leg 312. The reference signal 621 is compared with a pair of carrier signals 673 and 674 to generate PWM signals for the 3-level diode clamped leg 392. The reference signal 622 is compared with a pair of carrier signals 675 and 676 to generate PWM signals for the 3-level diode clamped leg 394. The reference signals 611, 621, and 622 and carriers signals 671-676 are represented by the so-called modulation indices, which represent a normalized voltage with respect to the DC bus voltage. For example, if the positive and negative DC bus voltages of a 3-level diode clamped leg are +/−3 kV, the modulation index of 1 equals to +3 kV and the modulation index of −1 equals to −3 kV. The reference signals 611, 621, and 622 may be sinusoidal signals corresponding in frequency and phase to the desired output voltages of the 3-level diode clamped legs 312, 392, and 394. The reference signal 611, 621, and 622 may also include a harmonic component of three times the fundamental frequency of the desired output voltages of the 3-level diode clamped legs 312, 392, and 394 to maximize the linear modulation region of PWM. The carrier signals 671-676 may be triangle signals corresponding in frequency to the desired switching frequency of the switching components of the 3-level diode clamped legs 312, 392, and 394. The pair of carrier signals 671 and 672, 673 and 674, and 675 and 676 may be out of phase with one another within each pair by a specified displacement angle, for example, 180 degrees, and may also be out of phase between different pairs by another specified displacement angle, for example, 120 degrees, as shown in FIG. 6. The references signals 611, 621, and 622 may have identical frequency and amplitude, which essentially means to divide the output AC voltage equally across the three 3-level diode clamped legs 312, 392, and 394, and the carrier signals 671-676 may have identical frequency and amplitude, specifically when 3-phase bridge 302 and the single-phase bridges 304, 306, and 308 are composed of identical 3-level diode clamped legs and operate at equal DC bus voltages.

Figure 7:
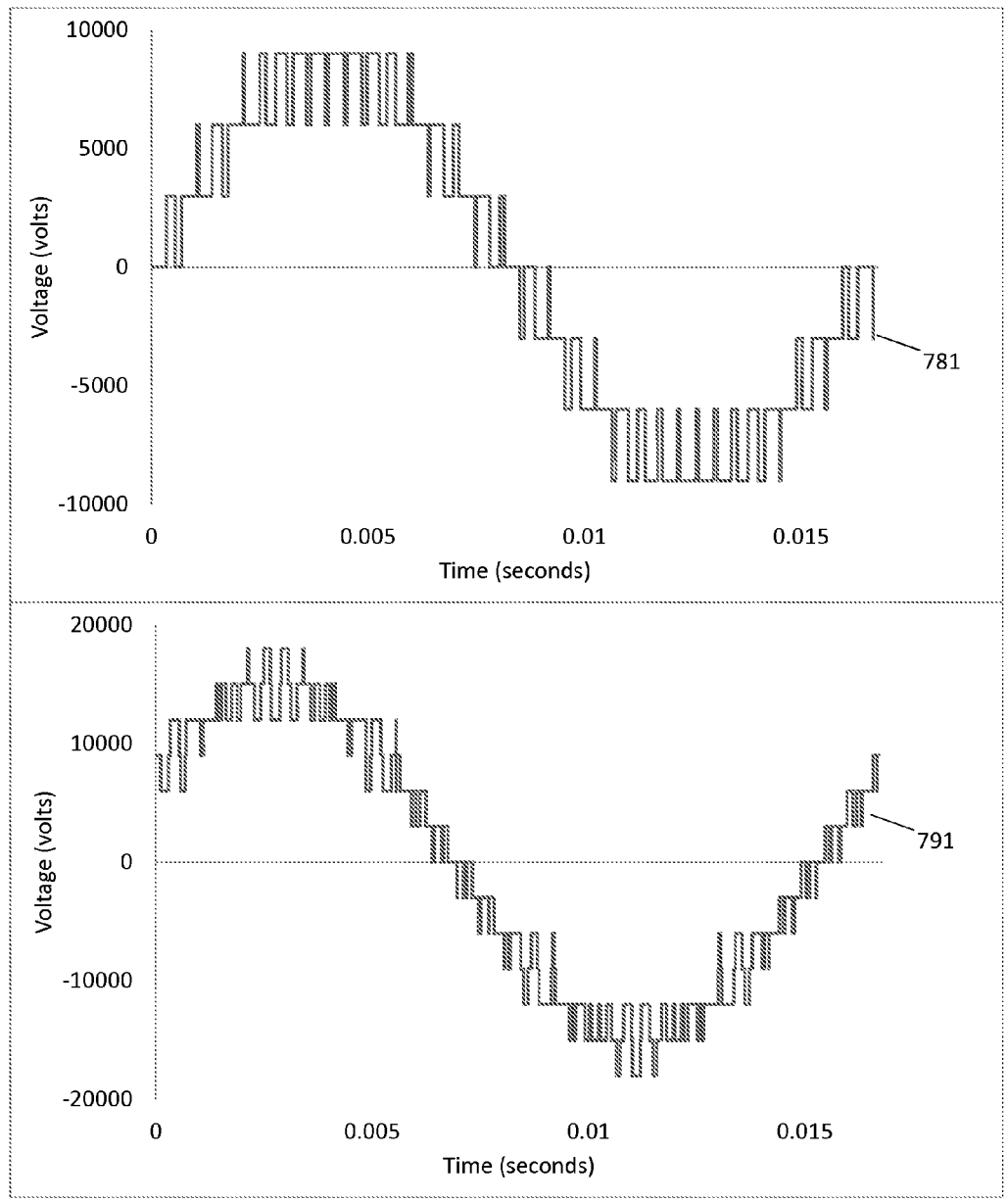
FIG. 7 is a waveform diagram illustrating exemplary output voltages that may be provided by the exemplary 3-phase electric circuit of FIG. 4 employing the exemplary control strategy of FIG. 6.

The exemplary 3-phase electric circuit 300 of FIG. 4, employing the control strategy illustrated in FIG. 6, was simulated. FIG. 7 illustrates the simulation waveforms of one AC output phase voltage 781 and one phase-to-phase voltage 791 that may be provided by the exemplary 3-phase electric circuit 300 employing the exemplary control strategy in FIG. 6. In the simulation, the 3-phase bridge 302 and the single-phase bridges 304, 306, and 308 were assumed to consist of identical 3-level diode clamped legs. They were assumed to operate at an equal DC bus voltage of 6 kV with an identical modulation index of 0.9 for the reference signals 611, 621, and 622. The exemplary 3-phase electric circuit 300 generated a 10 kV root-mean-square (RMS) AC phase-to-phase voltage 791. If the DC bus voltages were reduced to 4 kV, the exemplary 3-phase electric circuit 300 could generate a 6.6 kV RMS AC phase-to-phase voltage 791. It is apparent that the phase voltage 781 included seven discrete voltage levels and the phase-to-phase voltage 791 included eleven discrete voltage levels.

Figure 8:
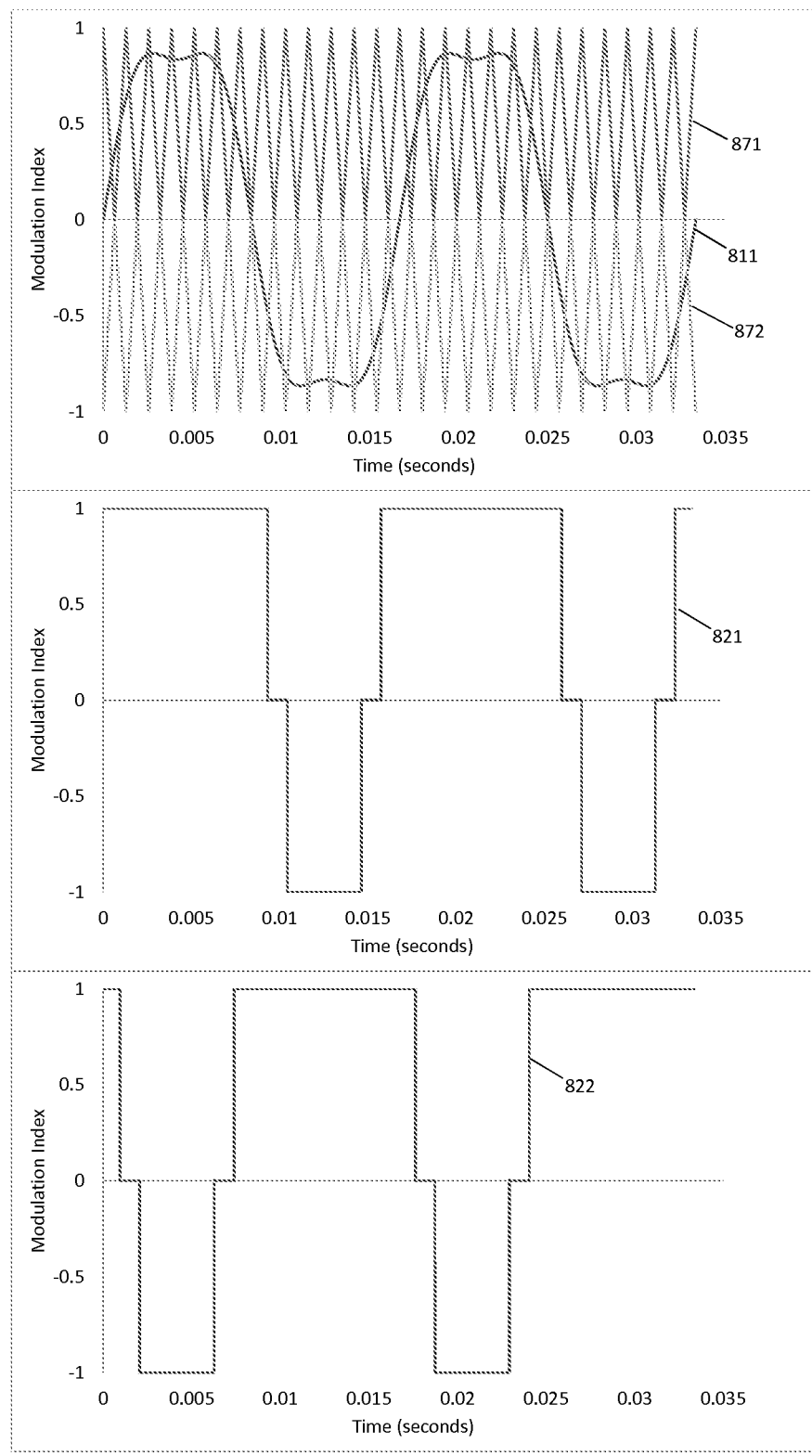
FIG. 8 is a waveform diagram illustrating another exemplary set of reference and carrier signals, and periodic patterned pulse signals that may be used to generate gating signals for controlling the exemplary 3-phase electric circuit of FIG. 4.

Another exemplary control strategy is illustrated in FIG. 8 that may be used for controlling the exemplary 3-phase electric circuit 300 in FIG. 4. Because the three phases A, B, and C are controlled symmetrically, control strategy for only phase A is described herein. In this control strategy, the 3-level diode clamped leg 312 may be controlled by pulse-width-modulation (PWM) signals generated by comparing a reference signal 811 with a pair of carrier signals 871 and 872. As shown in FIG. 8, The reference signal 811 is a sinusoidal signals including a third harmonic component, corresponding in frequency and phase to the desired output voltages of the 3-level diode clamped leg 312 (FIG. 6). The carrier signals 871 and 872 may be triangle signals corresponding in frequency to the desired modulation frequency of the switching components of the 3-level diode clamped legs 392 and 394, and may be out of phase with one another by a specified displacement angle, for example, 180 degrees (FIG. 6). However, the 3-level diode clamped legs 392 and 394 are controlled by periodic patterned pulse signals 821 and 822 respectively, as illustrated in FIG. 8. The patterned pulse signals 821 and 822 may be determined according to the desired fundamental output voltage and selected harmonic components to be eliminated. For example, the periodic patterned pulse signals 821 and 822 can be decomposed into a series of fundamental and harmonic components by Fourier analysis, which are functions of the switching angles within the patterned pulses. Given the desired fundamental output voltages and selecting certain harmonic components, e.g. the low-frequency harmonics, for elimination, one can calculate the switching angles and determine the pulse pattern of the patterned pulse signals 821 and 822. The frequency or period of the patterned pulse signals 821 and 822 are equal to those of the desired fundamental voltage. One incentive of using such periodic patterned pulse signals 821 and 822 is to lower the switching frequency of the semiconductor devices, while eliminating dominant low-frequency harmonics to still maintain reasonable harmonic distortion. It is specifically beneficial for high voltage devices that cannot switch at a very high frequency. The gating signals of the 3-level diode clamped legs 312, 392, and 394 may be rotated if 3-phase bridge 302 and the single-phase bridges 304, 306, and 308 are composed of identical 3-level diode clamped legs and operate at equal DC bus voltages, since the AC output voltage is synthesized by adding the output voltages of the 3-level diode clamped legs 312, 392, and 394 together. For example, at one instance, the 3-level diode clamped legs 312, 392, and 394 each receives gating signals for its own switching devices. At the next instance, the gating signals of 312 are applied to the switching devices of 392, the gating signals of 392 are applied to the switching devices of 394, and the gating signals of 394 are applied to the switching devices of the leg 312. The rotating mechanism may reduce the average switching frequency of the switching elements among the 3-phase bridge 302 and single-phase bridges 304, 306, and 308.

Figure 9:
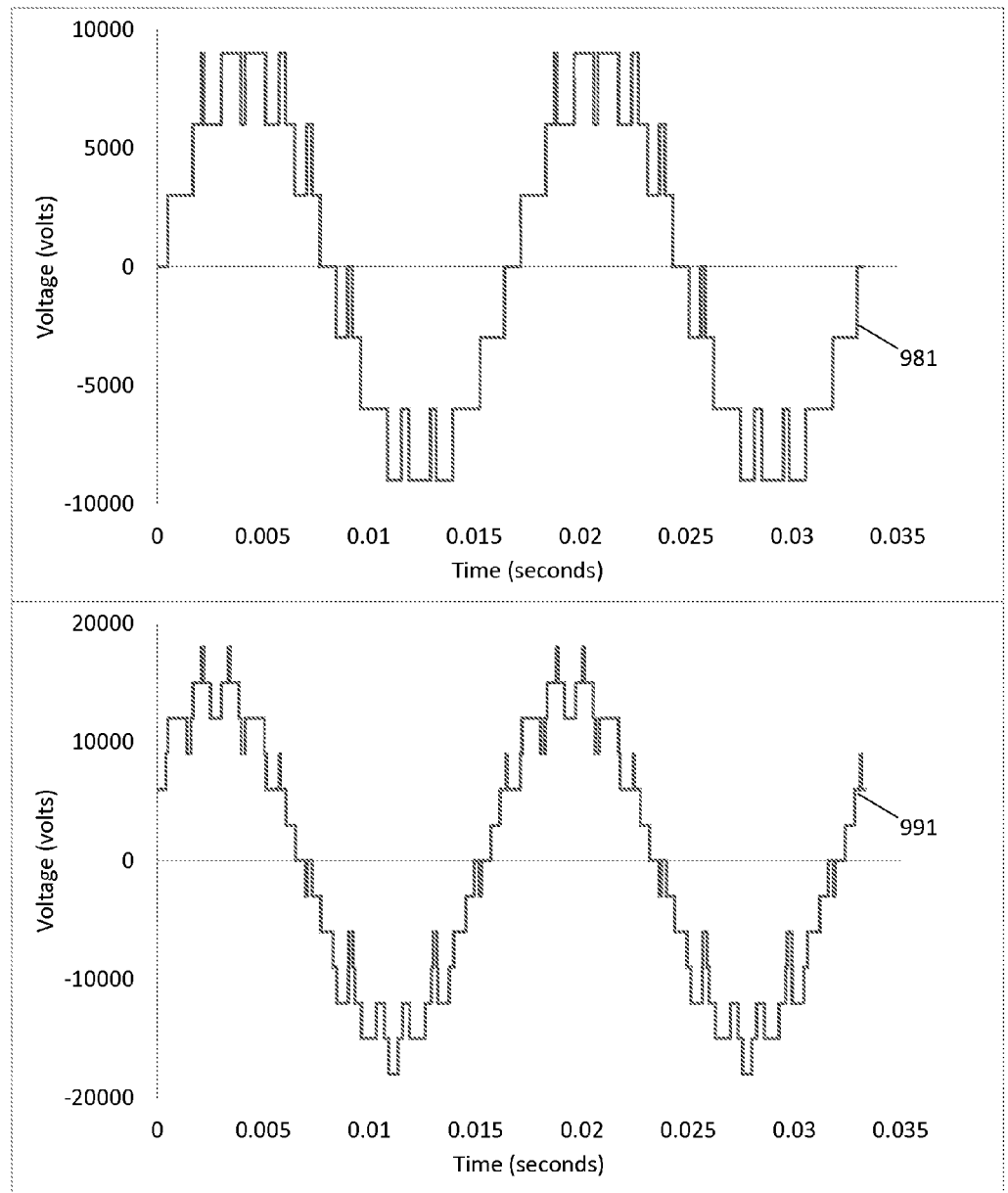
FIG. 9 is a waveform diagram illustrating exemplary output voltages that may be provided by the exemplary 3-phase electric circuit of FIG. 4 employing the exemplary control strategy of FIG. 8.

The exemplary 3-phase electric circuit 300 of FIG. 4, employing the control strategy illustrated in FIG. 8, was simulated. FIG. 9 illustrates the simulation waveforms of one AC output phase voltage 981 and one phase-to-phase voltage 991 that may be provided by the exemplary 3-phase electric circuit 300 employing the exemplary control strategy in FIG. 8. In the simulation, the 3-phase bridge 302 and the single-phase bridges 304, 306, and 308 were assumed to consist of identical 3-level diode clamped legs. They were assumed to operate at an equal DC bus voltage of 6 kV with an identical modulation index of 0.9 for the reference signals 811, 821, and 822. The exemplary 3-phase electric circuit 300 generated a 10 kV RMS AC phase-to-phase voltage 991. If the DC bus voltages were reduced to 4 kV, the exemplary 3-phase electric circuit 300 could generate a 6.6 kV RMS AC phase-to-phase voltage 991. It is apparent that the phase voltage 981 included seven discrete voltage levels and the phase-to-phase voltage 991 included eleven discrete voltage levels.

It should be understood that the exemplary 3-phase electric circuit 300 may be controlled by other control strategies, such as space vector modulation and selective harmonic elimination pulse width modulation.

Figure 5:
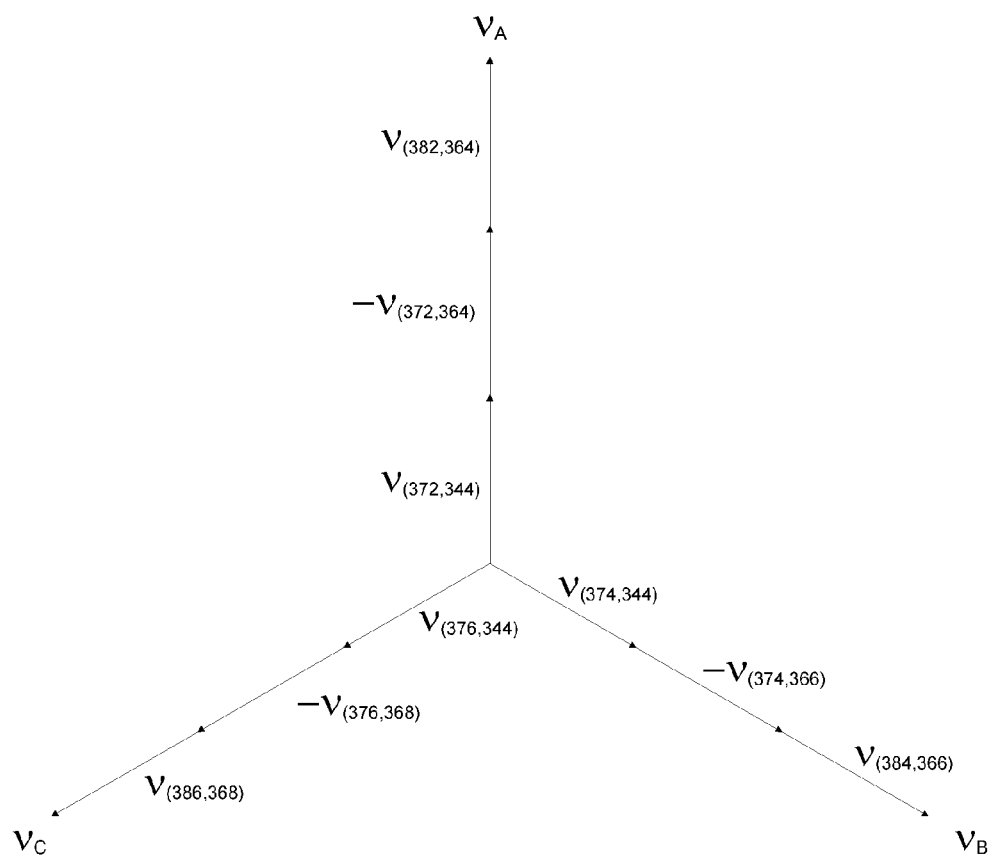
FIG. 5 is a vector diagram illustrating the voltage synthesization for controlling the exemplary 3-phase electric circuit of FIG. 4.
Figure 10:
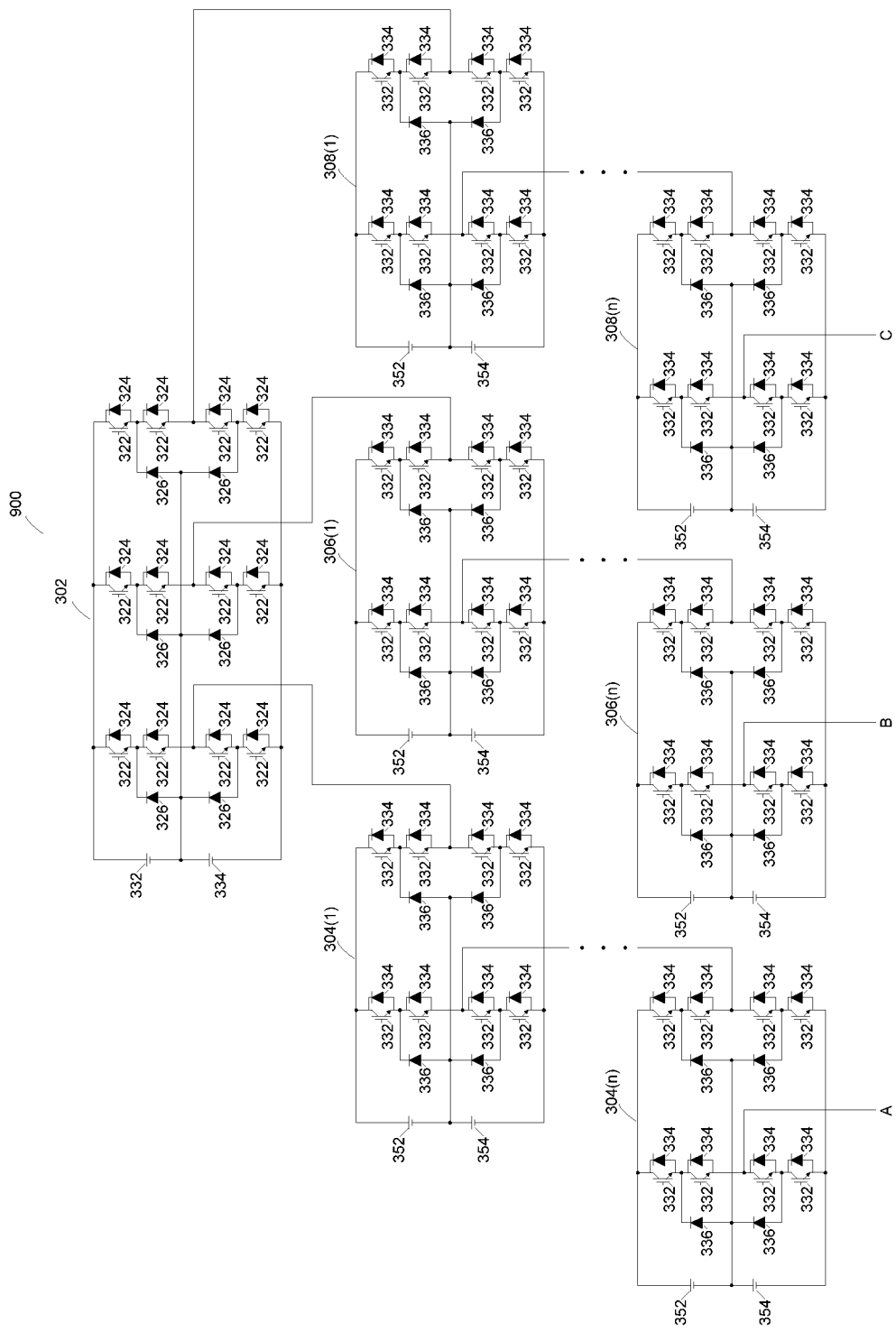
FIG. 10 is a simplified schematic diagram of an exemplary 3-phase (4n+3) level electric circuit in accordance with the present invention.

The electric circuit disclosed in the present invention may extend to a multi-phase (4n+3) level electric circuit, wherein n is equal to or greater than n=1. As illustrated in FIG. 10, a 3-phase (4n+3) level electric circuit 900 may include a 3-phase bridge 302 in series with three sets of identical single-phase bridges 304(1-n), 306(1-n), and 308(1-n) (FIG. 4). The 3-phase bridge 302 is composed of three 3-level diode clamped legs coupled to one DC bus, while the single-phase bridges 304(1-n), 306(1-n), and 308(1-n) each is composed of two 3-level diode clamped legs coupled to one DC bus. The DC buses of the 3-phase bridge 302 and single-phase bridges 304(1-n), 306(1-n), and 308(1-n) are isolated from each other. The 3-phase bridge 302 and single-phase bridges 304(1-n), 306(1-n), and 308(1-n) may use identical 3-level diode clamped legs, and operate at equal DC bus voltages. The 3-phase AC output voltages of the 3-phase (4n+3) electric circuit 900 are synthesized by the output voltages of the 3-phase bridge 302 and the output voltages of the single-phase bridges 304(1-n), 306(1-n), and 308(1-n) (FIG. 5). The 3-phase bridge 302 and the single-phase bridges 304(1-n), 306(1-n), and 308(1-n) may be controlled by the control strategies disclosed in above descriptions, for example, the exemplary control strategies in FIGS. 5 and 7. With n sets of single-phase bridges 304(1-n), 306(1-n), and 308(1-n), one can achieve a (4n+3) level waveform for the AC output phase voltages by controlling the switching elements appropriately.

What is claimed is:

1. An electric circuit, comprising:
   a multi-phase bridge, wherein the multi-phase bridge is composed of a plurality of 3-level diode clamped legs connected in parallel across one DC bus;
   a plurality of single-phase bridges, wherein each of the plurality of single-phase bridges is composed of two 3-level diode clamped legs connected in parallel across one DC bus;
   wherein the multi-phase bridge is connected in series with the plurality of single-phase bridges for each phase;
   wherein the DC buses of the multi-phase bridge and the plurality of single-phase bridges are isolated from each other; and
   wherein each phase connects to a load without a reactor at AC output.

2. The electric circuit of claim 1, wherein the multi-phase bridge and the plurality of single-phase bridges are composed of identical 3-level diode clamped legs.

3. The electric circuit of claim 2, wherein the multi-phase bridge and the plurality of single-phase bridges operate at an equal DC bus voltage.

4. A method of power conversion, comprising the steps of:
   providing a multi-phase bridge composed of a plurality of 3-level diode clamped legs connected in parallel across one DC bus;
   providing a plurality of single-phase bridges each composed of two 3-level diode clamped legs connected in parallel across one DC bus, wherein the DC buses of the plurality of single-phase bridges and the multi-phase bridge are isolated from each other;
   connecting each leg of the multi-phase bridge in series with the plurality of single-phase bridges for each phase;
   providing gating signals for the multi-phase bridge and the plurality of single-phase bridges to synthesize AC voltage waveforms; and
   connecting each phase to a load without a reactor at AC output.

5. The method of claim 4, wherein the gating signals are provided by comparing a set of one reference signal and a pair of triangular carrier signals for each 3-level diode clamped leg of the multi-phase bridge and the plurality of single-phase bridges, wherein the pair of triangular carrier signals is out of phase with each other by a displacement angle for one 3-level diode clamped leg and out of phase by another displacement angle for another 3-level diode clamped leg.

6. The method of claim 5, wherein the reference signal is a sinusoidal signal with fundamental frequency of desired output AC voltage.

7. The method of claim 5, wherein the reference signal is a sinusoidal signal with fundamental frequency of desired output AC voltage, superimposed by a harmonic component that is three times fundamental frequency of desired output AC voltage.

8. The method of claim 4, wherein the gating signals are provided by comparing a set of one reference signal with a pair of triangular carrier signals to generate gating signals for each 3-level diode clamped legs of the multi-phase bridge and by calculating periodic patterned pulse according to fundamental and selected harmonics for elimination of desired output AC voltage for each 3-level diode clamped legs of the plurality of single-phase bridges.

9. The method of claim 8, wherein the reference signal is a sinusoidal signal with fundamental frequency of desired output AC voltage.

10. The method of claim 8, wherein the reference signal is a sinusoidal signal with fundamental frequency of desired output AC voltage, superimposed by a harmonic component that is three times fundamental frequency of desired output AC voltage.

11. The method of claim 8, wherein the gating signals for 3-level diode clamped legs of the multi-phase bridge and the gating signals for 3-level diode clamped legs of the plurality of single-phase bridges are rotated among the 3-level diode clamped legs of the same phase, wherein each phase is composed of the 3-level diode clamped leg of the multi-phase bridge connected in series with the 3-level diode clamped legs of the plurality of single-phase bridges respectively.

* * * * *